United States Patent [19]

Schmidle et al.

[11] 4,273,819
[45] Jun. 16, 1981

[54] DIFFERENTIAL GLOSS PRODUCTS AND METHODS OF MAKING THE SAME

[75] Inventors: Claude J. Schmidle, Trenton, N.J.; Seevaram N. Varadhachary, Newtown, Pa.

[73] Assignee: Congoleum Corporation, Kearny, N.J.

[21] Appl. No.: 168,844

[22] Filed: Jul. 10, 1980

[51] Int. Cl.³ .................. B32B 5/20; B32B 31/22; B32B 31/26
[52] U.S. Cl. .................. 428/159; 156/79; 156/219; 156/220; 156/240; 156/246; 156/247; 156/277; 264/52; 264/DIG. 82; 427/264; 427/373; 428/207; 428/315
[58] Field of Search ............ 156/79, 219, 220, 240, 156/246, 247, 277; 264/52, DIG. 82; 427/264, 373; 428/158, 159, 315, 207

[56] References Cited

U.S. PATENT DOCUMENTS

| | | | |
|---|---|---|---|
| 3,293,094 | 12/1966 | Nairn et al. | 428/158 |
| 3,293,108 | 12/1966 | Main et al. | 428/159 |
| 4,187,131 | 2/1980 | Shortway et al. | 428/159 |
| 4,214,028 | 7/1980 | Shortway et al. | 428/159 |
| 4,217,385 | 8/1980 | Shortway et al. | 428/159 |

*Primary Examiner*—William J. Van Balen
*Attorney, Agent, or Firm*—Richard T. Laughlin

[57] ABSTRACT

A method of making a differential gloss product which comprises: forming a foamable base resinous plastisol on a substrate; gelling the base resinous plastisol; applying to the base resinous plastisol various printing ink compositions in a predetermined pattern, some portions of which contain a blowing inhibitor and a polymerization temperature-lowering promoter, either in the same or different portions; applying to the printed base resinous plastisol a resinous wear layer containing a polymerizable and/or cross-linkable monomeric material and a free radical polymerization catalyst; gelling the wear layer; mechanically dull mat embossing the entire surface of the wear layer at a temperature below the normal decomposition temperature of the catalyst but which is sufficient to decompose the catalyst in those portions of the wear layer lying directly over the polymerization temperature-lowering promoter present in some portions of the printed pattern, whereby the polymerizable monomeric material polymerizes to become cross-linked in some portions of the wear layer to permanently set the dull mat embossing thereon; and heating to a temperature sufficient to blow the foamable base resinous plastisol and to cause the dull mat embossing to flow into a smooth glossy surface in those other portions where the polymerizable monomeric material is not cross-linked and to decompose the catalyst in such other portions to bring about a cross-linking of the polymerizable monomeric material therein to permanently set the smooth, glossy surface of the wear layer in such other portions, whereby the wear is substantially completely polymerized and substantially completely monomer-free.

13 Claims, 2 Drawing Figures

DIFFERENTIAL GLOSS PRODUCTS AND METHODS OF MAKING THE SAME

THE FIELD OF THE INVENTION

The present invention relates to decorative sheet materials, and more particularly to multi-layered resinous decorative sheet materials having surface portions with differential gloss effects and the methods of making the same. Even more particularly, the present invention relates to differential gloss decorative sheet materials having embossed or textured surface areas in substantially perfect registry with the areas having the surface differential gloss effects which, in turn, are in substantially perfect registry with the pattern of the printing ink compositions used to provide desired patterns or designs. Such differential gloss decorative sheet materials are of use as: floor, wall or ceiling coverings; desk, table and counter tops; and a host of other commercial, industrial and household applications.

THE GENERAL BACKGROUND OF THE INVENTION

Decorative sheet materials of a resinous polymer composition have been manufactured for many years and one of the commonest means of creating or enhancing the decorative effects has been to provide selected portions of the surface of such decorative sheet materials with differential types of contrasting surfaces or finishes, or surface gloss or luster differentials, for example, with smooth, glossy or lustrous surfaces contrasting with dead, dull or mat surfaces, and with raised or embossed surfaces contrasting with regular or normal height surfaces. Many methods, including mechanical embossing, inlaying or chemical etching, and other methods, have been devised to provide such sharply contrasting differential surfaces but all of such prior art methods have always left something to be desired. For example, differential mechanical embossing combined with pattern or design printing has always created registration problems and related difficulties. Inlaying and chemical etching have normally been costly and process-time consuming.

PURPOSES AND OBJECTS OF THE INVENTION

It is therefore a principal purpose and object of the present invention to provide resinous polymer compositions in relatively flat sheet material form having selective surface decorative effects caused by the controlled placement of various differential surface finishes, embossings, or surface gloss differentials, wherein smooth, glossy or lustrous surfaces contrast with dead, dull or mat surfaces and raised or embossed surfaces contrast with regular or normal height surfaces, all in substantially perfect registry with the printed pattern or design, using methods in which registration problems and difficulties are substantially completely eliminated and which methods are neither costly nor process-time consuming.

BRIEF SUMMARY OF THE INVENTION

It has been found that such principal purposes and objects, and other principal purposes and objects, which will become clear from a further reading and understanding of this disclosure, may be accomplished by providing a method of making a differential gloss product which comprises: forming a potentially foamable base resinous plastisol on a supporting substrate or structure, such as a fibrous backing sheet; gelling and firming the potentially foamable base resinous plastisol; applying to the surface of the gelled, potentially foamable base resinous plastisol various printing ink compositions in a predetermined pattern or design, some portions of the predetermined pattern or design containing a blowing or foaming inhibitor and/or a polymerization temperature-lowering promoter, either in the same portions or in different portions; applying to the surface of the printed, gelled potentially foamable base resinous plastisol a resinous wear layer plastisol composition containing substantially uniformly therein reactive polymerizable and/or cross-linkable monomeric materials and a free radical polymerization catalyst; gelling and firming the resinous wear layer; mechanically dull mat embossing substantially the entire surface of the gelled wear layer at a temperature below the normal decomposition or activation temperature of the catalyst in the wear layer but which temperature is sufficient to bring about the decomposition or the activation of the catalyst in those portions of the resinous wear layer lying superjacently directly above the polymerization temperature-lowering promoter included in some portions of the printing ink composition, whereby the reactive polymerizable and/or cross-linkable monomeric materials polymerize to become cross-linked to permanently set the mechanically dull mat embossing in the promoted portions of the wear layer; and heating the multilayered resinous structure to a temperature sufficiently elevated as to blow or foam the potentially foamable base resinous plastisol and to cause the mechanically dull mat embossing in those other portions of the resinous wear layer where the reactive polymerizable monomeric materials are not cross-linked or thermoset to soften and to flow thereat into a smooth, glossy surface and to decompose or activate the catalyst in the resinous wear layer to bring about a polymerization and/or cross-linking of the reactive polymerizable monomeric materials therein to permanently set the smooth, glossy surface on such other portions of the surface of the resinous wear layer.

It is to be appreciated that the above simplified and abbreviated illustrative method is merely one of several variations capable of making the resinous polymer sheet materials of the present invention; that it is merely illustrative of the broader aspects of the present invention; and that some conventional and standard steps such as heating, gelling, cooling, drying, etc. have been omitted for purposes of clarity and brevity.

BRIEF DESCRIPTION OF THE DRAWINGS

In the following specification and accompanying self-explanatory drawings, there are described and illustrated preferred and typical embodiments of the present invention but it is to be appreciated that the present invention is not to be construed as limiyed to such preferred and typical embodiments as are specifically disclosed and illustrated therein but to include ither similar and equivalent embodiments, as are determined by the spirit and the scope of the appended claims.

Referring to the accompanying self-explanatory drawings.

Figure 1:
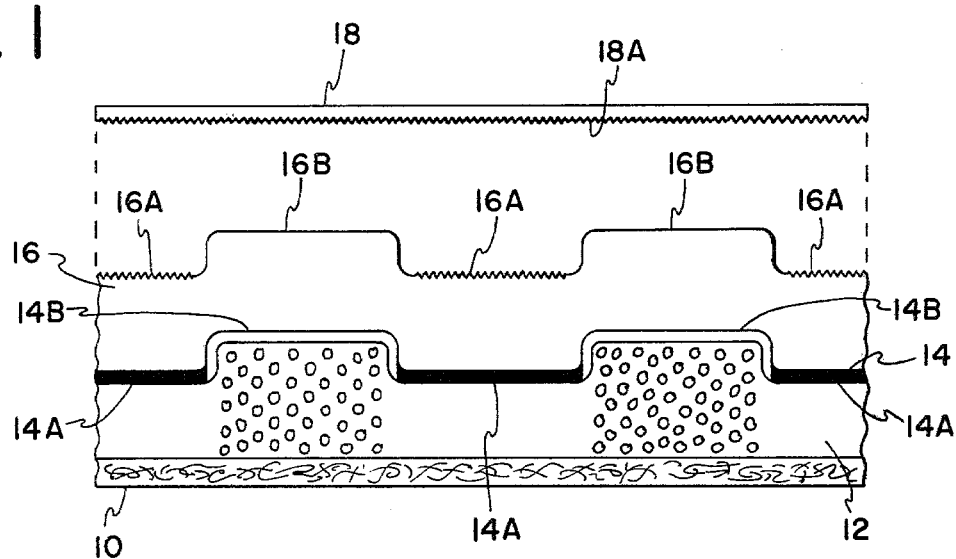
FIG. 1 is a fragmentary, diagrammatic, elevational, cross-sectional view of one embodiment of the present invention, showing the resinous polymer sheet product in its final form, subsequent to heating and blowing; and FIG. II is a fragmentary, diagrammatic, elevational, cross-sectional view of another embodiment of the present invention, showing the resinous polymer sheet product in its final form, subsequent to heating and blowing.
Figure 2:
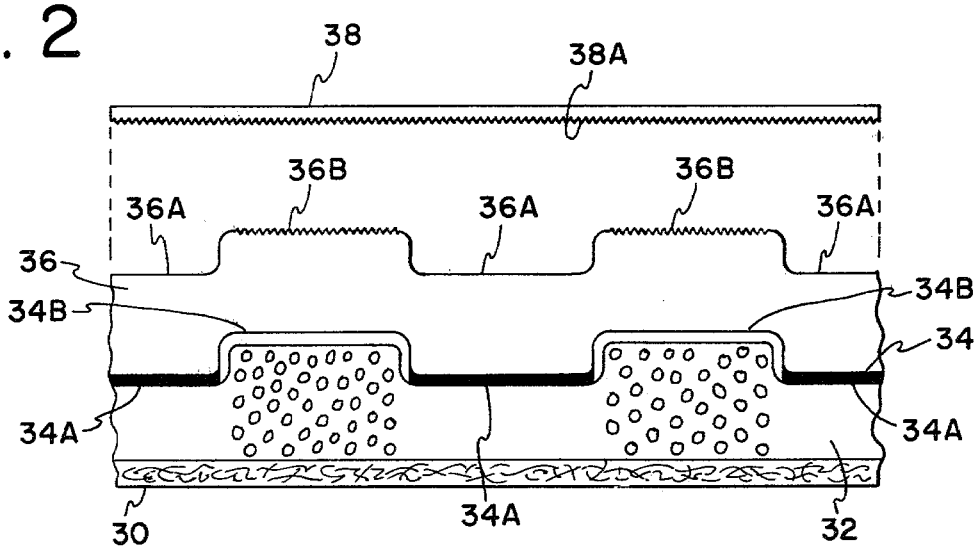

These Figures have not been drawn precisely or accurately to a scale. Some portions and some dimensions therein have been drawn to a slightly larger scale, whereas certain other portions and dimensions therein have been drawn to a slightly smaller scale. This has been done merely to bring out more clearly some of the details of the smaller portions and elements and to accentuate some of the more important features and aspects of the present invention, one such increase in size being the thickness of the printing ink composition layer which has been increased manyfold in the Figures.

GENERAL DESCRIPTION OF THE INVENTION

The present invention will be generally described and illustrated primarily with reference to FIG. I which is a preferred and typical embodiment of the invention but which is not to be construed as limitative of the broader aspects of the inventive concept. In FIG. I, there is illustrated a relatively flat, fibrous backing sheet material 10 upon which is deposited or formed a conventional and standard, potentially foamable base resinous plastisol composition 12, or, if so desired. a conventional and standard non-foamable base resinous plastisol composition (not shown) which does not contain any blowing or foaming agent.

THE BACKING SHEET MATERIAL

The backing sheet material 10 may be a matted or felted fibrous sheet, a woven fabric, a knitted fabric, a non-woven fabric, or substantially any type of relatively flat sheet material which is formed of mineral fibers, natural fibers of wool or of cellulosic origin, synthetic or man-made fibers or filaments such as rayon, nylon, polyesters, polyolefins, etc., asbestos, glass wool, mineral or slag wool, metallic threads, etc. Such a sheet material may be previously impregnated or saturated with a water-resistant or strengthening impregnant, such as a vinyl resin, a phenolic resin, a butadiene-styrene resin, or other thermoplastic, cross-linking, or thermosetting resins.

The thickness of such a relatively flat, backing sheet material 10 will depend to a large extent upon the particular product to be made and the particular subsequent use for which it is intended. Normally, such thicknesses are in the range of from about 10 mils to about 90 mils, but other thicknesses, especially those greater than 90 mils, may be used in special and particular circumstances.

Additional examples of other backing sheet materials may be found in U.S. Pat. Nos. 3,293,094, 3,293,108 and 4,187,131.

THE FOAMABLE BASE RESINOUS PLASTISOL

The potentially foamable base resinous plastisol composition 12 which is applied to the backing sheet material 10 is preferably a dispersion or a suspension of a synthetic resin in a liquid or a semi-liquid medium. The dispersing or suspending medium may be water in the case of an aquasol or aqueous latex, or it may be an organic solvent in the case of an organosol, or it may be a plasticizer in the case of a plastisol.

Plastisols are preferred because of their ease of handling and the fact that their use does not require the subsequent removal of large volumes of water in the case of an aqueous latex or aquasol, or the subsequent removal and possible necessary recovery of large amounts of organic solvents in the case of an organosol.

The preferred and most widely used synthetic resin present in such a plastisol is polyvinyl chloride, either as a homopolymer, co-polymer, terpolymer, block polymer, etc. However, many other synthetic resins are of use, such as polyolefins such as polyethylene and polypropylene, acrylates and methacrylates, polyesters, polyamides, polystyrene, phenolics, ureas, synthetic and natural rubber, urea-formaldehyde, neoprene, etc.

Various plasticizers, such as dibutyl sebacate, butyl benzyl phthalate, di(2-ethylhexyl) phthalate, dioctyl phthalate, etc., may also be included in the potentially foamable base resinous plastisol composition 12, as well as various stabilizers such as phenyl phthalate, dibasic lead phosphite, etc., to reduce the harmful effects of light- and heat-degradation. Pigments such as titanium dioxide, as well as blowing or foaming agents such as azodicarbonamide may also be included. Accelerators, inhibitors, catalysts, anti-oxidants, viscosity-controlling agents, etc., may also be included. Typical formulations and compositions are to be noted in the previously mentioned U.S. patents.

If no backing sheet material 10, such as a felted or matted fibrous web, is to be used, then the base resinous plastisol 12 may be applied by a doctor blade, or roll coated, or poured, or cast or otherwise applied to a strippable or removable carrier which be a steel belt, a rubber belt, release paper, or a felt or other fabric or material having a release surface thereon and subsequently stripped or removed therefrom.

However, if a backing sheet material 10 is to be used and is to remain as part of the final product, then the base resinous plastisol may be applied by a doctor blade, or roll coated, or poured or cast or otherwise applied to the carrying sheet material 10 in a substantially uniform manner in a relatively thin coating by procedures well known in the art.

In either event, the thickness of such a base resinous plastisol as applied and still wet, is in the range of from about 5 mils to about 50 mils, or even more, if so desired or required.

THE GELLING OF THE BASE RESINOUS PLASTISOL COMPOSITION

After the potentially foamable base resinous plastisol composition 12 has been applied to the backing sheet material 10, it is then heated in an oven or other suitable heating device at an elevated temperature of from about 240° F. to about 400° F. for a period of time of about 1 minute to about 4 minutes whereby it gels and becomes firm. Such elevated temperature, however, is not that high as to activate or decompose the blowing or foaming agent as to blow or foam the base resinous plastisol composition.

THE PRINTING OF THE BASE RESINOUS PLASTISOL COMPOSITION

The gelled, firm base resinous plastisol composition 12 is then cooled and is printed or coated with a suitable printing ink composition or compositions 14 in the desired or required pattern or design which may possess many colors. The particular pattern or design which is used does not relate to the essence of the present invention and any suitable pattern or design may be used.

The specific details of the printing procedure are conventional and should require no further description, inasmuch as such procedures are well known in the industry and are described in many prior art patents and publications.

If it is desired that different levels of heights of the blowing or foaming effects be obtained, then, predetermined portions or parts of the pattern or design on the surface of the base resinous plastisol contain a blowing or foaming modifier or inhibitor in different amounts, concentrations, or types, and so forth, depending upon the variety of differential blowing or foaming effects desired. Such differential effects are well described in the previously mentioned U.S. patents and should need no further explanation or description.

Naturally, if no differential blowing or foaming effects are desired as a result of the heated blowing or foaming operation, then no blowing or foaming inhibitors are included in the base resinous plastisol composition printing ink composition and the levels and the extent of the blowing or foaming action is generally uniform. Some typical conventional printing ink compositions are noted in the previously mentioned U.S. patents.

In FIG. I, blowing or foaming modifiers or inhibitors are noted as present in the areas 14A which are shaded, whereas there are no blowing or foaming modifiers or inhibitors present in the areas 14B which are not shaded.

The concentrations of the remaining constituents of the printing ink compositions which may include resins, pigments, dyes and colorants, solvents and diluents, blow modifiers and inhibitors, plasticizers, etc., are conventional and are within the ranges noted in the previously mentioned U.S. patents. With particular reference to the blowing or foaming modifiers or inhibitors, the preferred and typical examples of such include trimellitic anhydride, fumaric acid, benzotriazole, etc., which are normally present in an amount of from about 4% by weight to about 40% by weight, based on the total weight of the composition.

THE PROMOTERS

Additionally, however, there is also included in certain parts or portions of the predetermined pattern or design of the printing ink composition 14, a further ingredient, namely, a promoter or other chemical compound which is capable of lowering the polymerization temperature of certain reactive polymerizable monomeric materials to be described in greater detail hereinafter. More specifically, in the case of a polymerization reaction that is brought about by the activation or decomposition of an initiator, the particular promoter lowers the activation or decomposition temperature of the initiator or catalyst to a point wherein the polymerization and/or cross-linking, if such is involved, take place at a reduced or lower temperature which is below the activation or decomposition temperature of the particular initiator or catalyst.

As specific examples of such promoters suitable for use in the application of the principles of the present invention, the following may be cited as illustrative but not limitative;
cobalt naphthenate
vanadium naphthenate
N,N-dimethyl aniline
N,N-diethyl aniline
N,N-dipropyl aniline
N,N-dibutyl aniline
N,N-dimethyl-p-toluidine
N,N-diethyl-p-toluidine
N,N-dihydroxyethyl-p-toluidine Other N,N-dialkyl and dihydroxyalkyl anilines and other N,N-dialkyl and dihydroxyalkyl o-, m- and p-toluidines are also useful within the broader scope of the inventive concept.

The promoters are included in the desired printing ink compositions in amounts in the range of from about 1% by weight to about 10% by weight, based on the total weight of the particular printing ink composition. In FIG. I, the promoters are included in the shaded areas 14A, along with the blowing or foaming modifiers or inhibitors. The promoters are not included in areas 14B, in which there are no blowing or foaming modifiers or inhibitors.

THE RESINOUS WEAR LAYER

The printed, gelled potentially foamable base resinous plastisol 14 is allowed to dry and a resinous wear layer plastisol composition is then applied thereto to a substantially uniform thickness or depth. Such a wear layer composition contains conventional and standard constituents, such as synthetic resins, preferably a polyvinyl chloride polymer or co-polymer, plasticizers, dyes and pigments on some occasions, solvents or diluents, viscosity controlling agents, and like additives and materials. The concentrations of such constituents are conventional and standard and are in the ranges set forth in the previously mentioned U.S. patents.

THE REACTIVE POLYMERIZABLE MONOMERIC MATERIALS

Additionally, there is included in the formulation of the wear layer composition 14 a further ingredient comprising one or more reactive polymerizable monomeric materials, the polymerization and/or cross-linking of which can be initiated or catalyzed by selected polymerization initiators and catalysts. Such reactive polymerizable monomeric materials are included substantially uniformly in the formulation of the wear layer which will be described hereinafter with particular reference to the inclusion therein of polyvinyl chloride polymers or co-polymers, although many other synthetic resins are also of use.

The reactive polymerizable monomeric materials are polyfunctional and contain at least two olefinically unsaturated sites in its molecule. Such monomers must be capable of polymerization and/or cross-linking at desired elevated temperatures higher than the plastisol gelling temperature but lower than the decomposition temperature of the particular blowing or foaming agent used.

Preferred and typical reactive polymerizable monomers include:
Ethylene glycol dimethacrylate
Ethylene glycol diacrylate
Diethylene glycol dimethacrylate
Diethylene glycol diacrylate
Triethylene glycol dimethacrylate
Triethylene glycol diacrylate
Tetraethylene glycol dimethacrylate
Tetraethylene glycol diacrylate
Polyethylene glycol dimethacrylate
Polyethylene glycol diacrylate
1,3-butylene glycol dimethacrylate
1,4-butylene glycol dimethacrylate
1,3-butylene glycol diacrylate 1,4-butylene glycol diacrylate
1,4-butanediol diacrylate
1,6-hexanediol dimethacrylate
1,6-hexanediol diacrylate
Neopentyl glycol diacrylate
Neopentyl glycol dimethacrylate
Bisphenol A dimethacrylate (ethoxylated)
Divinyl benzene
Divinyl toluene
Trimethylol propane trimethacrylate
Trimethylol propane triacylate
Pentaerythritol triacrylate
Glyceryl trimethacrylate
Pentaerythritol tetraacrylate
Pentaerythritol tetramethacrylate
1,4-butanediol dimethacrylate Such monomeric materials are polyfunctional and include difunctional, trifunctional and tetrafunctional monomers. However, if desired a certain amount of monofunctional monomers may be included in the resinous wear layer in substantially uniform admixture with the polyfunctional monomers. Such combinations often possess unique and very desirable characteristics and properties.

When monofunctional monomers are included with the polyfunctional monomers, they are present in amounts of from about 5% by weight to about 50% by weight, based on the total weight of all monomers in the resinous wear layer formulation. The total weight of all monomers in the resinous wear layer is in the range of from about 5 parts by weight to about 40 parts by weight, based on 100 parts by weight of resin (phr) in the resinous wear layer formulation, or preferably from about 15 parts by weight to about 35 parts by weight, based on the 100 parts of the main resin (usually polyvinyl chloride polymer or co-polymer) in the resinous wear layer formulation. If no monofunctional monomers are present, such values, of course, represent the amount of the polyfunctional monomers present in the formulation.

The particular reactive polymerizable monomer or mixture of monomers which are selected for a particular use must be compatible with or dispersible in the resin representing the major constituent in the resinous wear layer formulation. It is usually contained in a polymer, co-polymer, or homopolymer of polyvinyl chloride. The reactive polymerizable monomers must be miscible or dispersible in substantially all proportions with the main resin and must be capable of being easily and intimately dissolved or dispersed therein without separating into separate, distinct layers or portions, or occupying separate, discrete portions or phases in the resinous wear layer composition. The reactive polymerizable monomers must also be relatively inert at low temperatures and non-reactive with respect to the other constituents of the resinous wear layer formulation.

THE FREE RADICAL POLYMERIZATION INITIATOR OR CATALYST

Additionally, there is included in the resinous wear layer 16 a free radical polymerization initiator or catalyst which is capable of polymerizing and/or cross-linking the reactive polymerizable monomeric materials under suitable temperature, time and pressure conditions. The free radical polymerization initiator or catalyst is included substantially uniformly in the resinous wear layer 16 and has a concentration therein of from about 0.2 percent by weight to about 20 percent by weight, and preferably from about 0.5 percent to about 10 percent by weight, based on the total weight of the resinous wear layer composition.

Preferred and typical free radical polymerization initiators and catalysts include, as illustrative but not limitative, the following:
Benzoyl peroxide
Diisobutyryl peroxide
2,4-dichlorobenzoyl peroxide
Diisononanoyl peroxide
Decanoyl peroxide
Lauroyl peroxide
Acetyl peroxide
Succinic acid peroxide
Bis-p-chlorobenzoyl peroxide
2,5-dihydroperoxy-2,5-dimethyl hexane
Cumene hydroperoxide
t-butyl hydroperoxide
p-methane hydroperoxide
Diisopropyl benzene hydroperoxide
1,1,3,3-tetramethyl butyl hydroperoxide
Di(n-propyl)peroxy dicarbonate
Diisopropyl peroxydicarbonate
Di(sec-butyl) peroxydicarbonate
Di(2-ethylhexyl) peroxydicarbonate
Dicyclohexyl peroxydicarbonate
Dicetyl peroxydicarbonate
Bis(4-t-butylcyclohexyl) peroxydicarbonate
t-butylperoxy isopropyl monocarbonate
1,1-bis(t-butylperoxy)-3,3,5-trimethylcyclohexane
t-butyl peroxyacetate
t-butyl peroxyisobutyrate
t-butyl peroxy-2-ethylhexanoate
t-butyl peroxypivalate
t-butyl peroxyneodecanoate
t-butyl peroxymaleic acid
Di-t-butyl diperoxyphthalate
2,5-dimethyl-2,5-bis(peroxybenzoyl) hexane
2,3-dimethyl-2,5-bis(octanoylperoxy) hexane
t-butyl peroctoate
t-butyl perbenzoate
acetylcyclohexyl sulfonyl peroxide
acetyl sec-heptyl sulfonyl peroxide
methyl ethyl ketone peroxide
2,4-pentanedione peroxide
cyclohexanone peroxide Such compounds cover several classes of per-compounds and equivalent materials and encompass a very wide range, all of which, nevertheless, are utilizable under selected conditions, with particular reference to the plastisol gelling temperatures, the plastisol and resinous polymer composition fusion temperatures, and the blowing or foaming temperatures which with respect to the preferred and typical operating conditions of the present invention, are normally commercially in the general range of about 300° F., 350° F. and 395° F., respectively. For the specific purposes of the present invention, a preferred and typical range of peroxides is noted as possessing one minute half-lives of from about 272° F. to about 376° F., with especially preferred commercial ranges of one minute half-lives of from about 305° F. to about 345° F. Such latter range will most easily permit satisfactory and sufficient cross-linking of the reactive polymerizable monomeric materials in the wear layer at the proper times. The thickness of the resinous wear layer composition 16, as first applied to the printed pattern or design of the printing ink composition 14 and still wet or fluid, is in the range of from about 2 mils to about 30 mils. or greater, if so desired by special circumstances, requirements or conditions.

GELLING OF THE RESINOUS WEAR LAYER

After the resinous wear layer containing the reactive polymerizable monomeric materials and the free radical polymerization initiator or catalyst has been applied and adhered to the printed pattern or design, it is heated under moderately gentle heat in an oven or other suitable heating device for a period of time of from about 1 to about four minutes at an elevated temperature of from about 240° F. to about 400° F., whereby it hardens or firms and gels so that it can be handled properly in further operations. Again, the elevated temperature is not that high as to activate or decompose the blowing or foaming agent in the base resinous composition. Nor is it sufficient to polymerize or to cross-link the reactive polymerizable monomeric materials which are in the resinous wear layer 16.

As will become evident from a further reading and understanding of this disclosure, it is normally contemplated that the polymerization of the polymerizable monomeric materials in the resinous wear layer will take place in two separate and distinct operations with the first of such operations polymerizing only certain parts of the resinous wear layer and the second of such operations polymerizing the other remaining parts of the resinous wear layer. The first of these operations will be a heated mechanical embossing operation at an elevated temperature which is normally not sufficiently high as to cause the free radical polymerization to become activated or decomposed under normal conditions and the second of these operations being a heated blowing or foaming and fusion operation at an even higher temperature, at which the free radical polymerization initiator or catalyst will become activated or decomposed to bring about the polymerization of the reactive polymerizable monomeric materials.

THE MECHANICAL EMBOSSING PROCEDURE

In the following description of the mechanical embossing procedure, the emphasis will be placed on the obtaining of a flat, dead or dull mat finish or texture which is roughened, textured, corrugated, contoured, knurled, lined, or the like. Such may be obtained by proper pressure dies or similar tools, or by pressing the surface of the resinous wear layer 16 against a suitably roughened or desirably corrugated or contoured surface, such as a fibrous paper or paper product surface 18A of a paper 18, or by other means such as an uneven or roughened metallic surface, or a fabric, or any coarse, grainy surface which is not smooth, sleek, glossy or lustrous. In FIG. 1, the mechanical embossing is illustrated as being accomplished by the use of the removable paper 18 having a dull, dead or roughened lower surface 18A and provided with a release coating, if such is deemed necessary to permit its subsequent removal after the mechanical embossing procedure and preferably before any subsequent heating, blowing or foaming or fusion procedures. The use of such a paper or paper product 18 is illustrative and not limitative of other applicable mechanical embossing procedures.

The mechanical embossing procedure covers substantially the entire surface of the resinous wear layer 16 to a depth of from as little as a fraction of a mil or the mechanical embossing may be deeper to as much as about 15 mils, but preferably is in the range of from about 1 mil to about 4 mils, depending upon the type, thickness, and the nature of the resinous wear layer 16 which is being mechanically embossed, also the decorative effect which is desired or required, as well as the type and the form of the mechanical embossing, and so forth.

At the conclusion of the mechanical embossing procedure, the entire surface of the resinous wear layer 16 is embossed so as to temporarily give it the desired flat, dead or dull mat finish or texture. Such finish or texture is substantially completely lacking in brilliance, gloss, luster or sheen.

The surface of the wear layer 16 may be roughened, corrugated, coarse, lined or knurled in a regular or irregular, predetermined or random fashion and may possess numerous very small projections, knobs, ridges, points, or protuberances to give it the desired flat, dead or dull mat surface appearance. The mechanical embossing may also take the form of very many, very fine lines which are straight and parallel, or are curved and swirling, as many as about 60, 80 or even 100 or more lines per inch, or it may be the result of pressing relatively coarse or rough paper, textured materials or fabrics, woven, knitted or nonwoven against the surface of the resinous wear layer 16.

The mechanical embossing to yield the desired flat, dead or dull mat finish or texture or other finishes may take place under a pressure which may be as low as about 2 pounds per square inch gauge up to about 300 pounds per square inch gauge, depending on the existing temperatures which may be in the range of from about 260° F. to about 420° F. If the pressure is applied in a press platen, the pressure may be maintained for a period of time of from about 10 seconds to as much as about 4 minutes. If the pressure is applied by means of a heated, rotating embossing roll, then the temperature and the pressures will be in the higher values of the aforementioned ranges, whereas the time of application of the pressure will be corresponding relatively short. However, the passing or the wrapping of the resinous polymer sheet materials around a portion of the periphery of the heated embossing roll can be used to extend the duration of the application of the heat and pressure. In any event, the pressures which are exerted must be sufficient as to establish a good intimate contact between the heated embossing surface and the resinous polymeric wear layer surface being embossed. Various combinations of elevated temperatures, applied pressures, and the periods of times of application may be employed.

With regard to the term polymerization "temperature-lowering promoter", such term more aptly indicates that the promoter lowers the temperature at which the free radical polymerization initiator or catalyst is decomposed or activated to generate or to release free radicals at a sufficiently high rate as to be commercially acceptable. For example, at room temperature, the free radical polymerization initiator or catalyst is theoretically decomposing but the rate of decomposition and the release of free radicals is so slow and so few that the catalytic action is substantially negligible and is unsatisfactory and unacceptable from a commercial viewpoint. In fact, from a process operative viewpoint, there is really no decomposition or activation. At gelling temperatures, say, about 300° F., for example, the rate of decomposition of the free radical polymerization initiator or catalyst is greater but the rate of generation of free radicals is still far too low as to be commercially satisfactory or acceptable and very little catalytic action is present. Again, from a process operative viewpoint, there is really no decomposition or activation to any sufficient extent.

At mechanical embossing temperatures, say, about 340°-360° F., for example, the rate of decomposition of the free radical polymerization initiator or catalyst is greater but the rate of generation of free radicals is still too low as to be commercially acceptable and little or insufficient catalytic action is present, unless, however, such catalytic action is aided and increased by the presence of a promotor. As a result, those surface portions 16A lying over the promoter-containing portions 14A become polymerized and/or cross-linked, whereas those surface portions 16B lying over the non-promoter-containing portions 14B are not polymerized and/or cross-linked during the mechanical embossing.

As a result, the surface portions 16A will possess an increased melt viscosity therein due to the polymerization and/or cross-linking of the monomeric materials therein and will possess a harder, more heat-resistant surface which is capable of resisting any softening or melting tendencies during any subsequent heating operations, such as a blowing or foaming and fusion procedure. In this way, such thermoset surface portions 16A are capable of retaining their flat, dead or dull mat mechanically embossed surface finishes or textures during subsequent heating at higher temperatures reached during blowing or foaming and fusion.

On the other hand, however, those predetermined surface portions 16B of the resinous wear layer 16 which lie directly over the portions 14B of the printing ink composition 14 which do not contain any temperature-lowering promoter are not materially polymerized or cross-linked, do not have an increased melt viscosity, and do not have a harder or more resistant thermoset surface and, consequently, when they are exposed subsequently to the greater heat at a more elevated temperature of the blowing or foaming and fusion procedure, they will not be able to resist any softening or melting tendencies which may be created at that time and they may melt and soften to flow or fuse into a smooth, glossy, shiny or lustrous finish having a relatively high brilliance and sheen. Such a glossy, lustrous surface portion 16B is very smooth and very planar and very reflective of any light incident thereon, as contrasted sharply to the flat, dead or dull mat finish 16A which is not smooth or sleek and is not as reflective of any light incident thereon. The contrast of these two surfaces is striking and is created as a result of the more elevated temperatures which prevail during the blowing or foaming and fusion operation.

THE BLOWING OR FOAMING AND FUSION OPERATION

The multi-layered resinous assembly comprising: the backing sheet material 10; the potentially foamable base resinous plastisol composition 12; the printed pattern or design 14A and 14B of the printing ink composition 14, the 14A portions containing blowing or foaming inhibitors and polymerization temperature-lowering promoters and the 14B portions containing neither the blowing or foaming inhibitors nor the polymerization temperature-lowering promoters; and the resinous wear layer 16 containing portions 16A which are mechanically embossed and which possess a relatively higher melt viscosity and are more heat-resistant and contain polymerized and/or cross-linked reactive polymerizable monomeric materials, as compared to the portions 16B which are also mechanically embossed but which possess a relatively lower melt viscosity and are relatively less heat resistant and do not contain any appreciable concentrations of polymerized and/or cross-linked reactive polymerizable monomeric materials is now heated to a sufficiently elevated temperature which is capable of activating or decomposing the blowing or foaming agents in the potentially foamable base resinous plastisol composition 12 as to cause vigorous blowing or foaming therein. Further, the fusion of the resinous materials takes place. And, the surface portions 16B of the resinous wear layer 16 are raised to the more highly elevated temperatures, which portions do not possess relatively higher melt viscosities or the polymerized and/or cross-linked thermoset monomeric materials, soften, melt and flow to form sleek, glossy and lustrous surfaces 16B. At the same time, those other surface areas 16A which possess the relatively higher melt viscosities and the polymerized and/or cross-linked thermoset monomeric materials resist the higher temperatures and do not soften, melt or flow but retain their flat, dead or dull mat embossed surface finish or texture. Such temperatures are in the range of from about 350° F. to about 470° F., depending upon the particular chemical compounds and materials employed.

Reference to FIG. 1 of the drawings will clarify the actions which occur during blowing and foaming. The base resinous plastisol 12 contained a blowing or foaming agent substantially uniformly therein. Those portions 14A of the printing ink composition 14 additionally contained a blowing or foaming inhibitor and hence such portions are relatively unblown or unfoamed. On the other hand, those portions 14B did not contain any blowing or foaming inhibitor and hence such portions are relatively blown and foamed. Such blowing or foaming inhibition is well described in the previously mentioned United States Patents and should require no further explanation or description.

However, there is an additional result of the blowing or foaming and fusion operation. The elevated temperatures which exist therein are higher than the temperatures which existed during the preceding heated embossing procedures which, in turn, were higher than the temperatures of the gelling operation, all of which preceding temperatures were insufficient to activate or to decompose the free radical polymerization initiator or catalyst in the resinous wear layer 16, unless such activation or decomposition was aided in specific areas, such as areas 16A due to their presence directly over the subjacent portions 14A of the printing ink composition 14 which contained the polymerization temperature-lowering promoter.

During the blowing or foaming and fusion procedure during which time such more highly elevated temperatures are reached, such temperatures will activate or decompose the free radical polymerization initiator or catalyst in any portion of the resinous wear layer 16 where they were not previously activated or decomposed, such as during the lesser elevated temperatures of the mechanical embossing operation. As a result, the reactive polymerizable monomeric materials in such previously unpolymerized or uncross-linked surface portions 16B will now become polymerized and/or cross-linked. Thus, the entire resinous wear layer 16 becomes polymerized and/or cross-linked, insofar as the reactive polymerizable monomeric materials are concerned, although it is to be noted that such polymerization and/or cross-linking takes place in two separate and distinct steps. First, there is the polymerization and/or cross-linking that takes place during the heated mechanical embossing procedure which is assisted by the promoter and, second, there is the polymerization and/or cross-linking that takes place during the heated blowing or foaming and fusion procedure which is at a higher temperature and which does not require and actually does not involve the polymerization temperature-lowering promoter. The resulting final product thus becomes substantially completely monomer free.

The final resulting product, in one form thereof, greatly resembles a ceramic tile flooring such as is commonly found in bathrooms and showers, both as a wall and floor covering surface. The sleek, glossy or lustrous surface finishes 16B greatly resemble the surface of the glazed or fired ceramic tile, whereas the flat, dead or dull mat surface finish 16A greatly resembles the groat or cementitious materials which are placed between the glazed ceramic tile.

THE MODIFICATION OF FIGURE II

In FIG. II, there is illustrated another embodiment of the application of the principles of the present invention in a varied form resulting in a different final product.

In FIG. II, there is illustrated a relatively flat, fibrous sheet backing material 30 upon which is deposited or formed a conventional, potentially foamable, base resinous plastisol composition 32 or, if so desired, a conventional non-foamable base resinous plastisol composition which does not contain a blowing or foaming agent.

The fibrous backing sheet material 30 is similar to the fibrous backing sheet material 10 of FIG. I and so is the potentially foamable, base resinous plastisol composition 30 similar to the potentially foamable, base resinous plastisol composition 12 of FIG. I. All other elements of FIG. II are similar to those of FIG. I, unless it is specifically designated or described otherwise. Such applies to a printing ink composition 34, a resinous wear layer 36, and a removable paper or paper product 38 having a lower roughened or dull surface 38A.

The printing ink composition or compositions 34 is similarly applied to the surface of the gelled, base resinous plastisol composition 32 but the disposition of the blowing or foaming inhibitors and the polymerization temperature-lowering promoters in certain portions thereof is different.

In FIG. I, the inhibitors and the promoters were together in the same portions 14A of the printing ink composition 14. In FIG. II, these chemical compounds are not together but are in separate and distinct different portions. In FIG. II, the inhibitors are in portions 34A, whereas the promoters are in portions 34B. The resinous wear layer 36 again includes substantially uniformly the reactive polymerizable monomeric materials, as well as the free radical polymerization initiator or catalyst.

It will be readily apparent that the surface portions 36A of the resinous wear layer which lie directly over the inhibitor-containing portions of the printing ink composition will not be raised or elevated during the blowing or foaming procedure, whereas the surface portions 36B will be raised or elevated during the blowing or foaming operation. This is the chemical embossing effect.

At the same time, the portions 36B which lie directly over the portions 34B of the printing ink composition 34 will retain the mechanically embossed dull or dead roughened surface, as shown, due to the fact that the polymerization temperature-lowering promoters in the portions 34B will lower the polymerization temperature of the monomeric materials due to the activation or decomposition of the free radical polymerization initiator or catalyst at lower temperatures, as explained previously. And, the portions 36A which were not polymerized or cross-linked during the heated mechanical embossing procedure will become polymerized and/or cross linked during the heated blowing or foaming and fusion operation to become sleek, shiny or glossy, because they will not be able to resist the elevated temperatures and will soften, melt and flow.

The final resulting product will have raised, elevated chemically embossed surface areas 36B of dead or dull mat appearance, whereas the normal height, chemically unembossed surface areas 36A will be shiny and glossy, with both surface areas in substantially perfect registry with the predetermined pattern or design of the printing ink composition 34. The present invention will be further described by reference to the following specific working Examples wherein there are disclosed preferred and typical embodiments of the inventive concept. However, it is to be appreciated that such specific Examples are merely illustrative of the principles of the invention and are not to be construed as limitative thereof nor of the broader aspects of the concept.

EXAMPLE I

A resinous polymer sheet material such as illustrated in FIG. I of the drawings is made by the following procedure:

The base layer or substrate comprises a relatively flat, 0.040 inch thick fibrous sheet of felted or matted asbestos fibers with an acrylic resin smooth leveling coating thereon. The asbestos felt fiber sheet is coated substantially uniformly to a wet thickness of about 0.015 inch with the following potentially foamable base resinous polymer plastisol composition:

|  | Parts |
| --- | --- |
| Polyvinyl chloride, medium mol. wt., general purpose dispersion resin, inh. vis. 0.99 (ASTM Di243-66) | 30.2 |
| Polyvinyl chloride, medium mol. wt., dispersion grade resin, inherent viscosity 1.0 | 8.2 |
| Polyvinyl chloride, medium mol. wt., blending resin, inherent viscosity 0.9 | 17.1 |
| Anhydrous alumina silicate filler | 6.9 |
| Butyl benzyl phthalate plasticizer | 15.4 |
| Alkyl belzyl phthalate, low b.p. plasticizer | 9.3 |
| Polydodecyl benzene | 7.4 |
| Azodicarbonamide blowing or foaming agent | 1.1 |
| Accelerator/stabilizer | 0.4 |
| Titanium dioxide | 2.5 |
| Dioctyl phthalate | 1.5 |
| Wetting agent | 0.1 |

Gelling and firming of the potentially foamable base resinous plastisol composition is accomplished in an oven at an elevated temperature of about 300° F. for about 2 minutes. This temperature is not sufficiently elevated as to activate or to decompose the azodicarbonamide blowing or foaming agent.

The gelled potentially foamable resinous plastisol is then printed with a ceramic brick pattern or design, as shown in FIG. I of the drawings. Zones 14B are printed with a conventional or standard printing ink composition containing a predetermined pigment or coloring agent but not containing any blowing inhibitor or any polymerization temperature-lowering promoter. Such a conventional printing ink composition comprises:

|  | Parts |
|---|---|
| Solution grade co-polymer of vinyl chloride (90 parts) and vinyl acetate (10 parts) | 15 |
| Methyl ethyl ketone | 85 |
| Pigment or colorant, as desired or required. | |
| Zones 14A, however, are printed with the following printing ink composition containing, among other ingredients, a different pigment or colorant: | |
| Solution grade co-polymer of vinyl chloride (90 parts) and vinyl acetate (10 parts) | 12 |
| Methyl ethyl ketone | 67 |
| Cobalt naphthenate promoter | 2 |
| Trimellitic anhydride inhibitor | 20 |
| Pigment or colorant, as desired or required. | |
| The printed, gelled potentially foamable resinous plastisol is then allowed to dry and a resinous wear layer is substantially uniformly applied thereto to a wet thickness depth of about 0.015 inch and having the following formulation: | |
| Polyvinyl chloride, dispersion grade, inh. vis. 0.8 | 100 |
| Trimethylol propane trimethacrylate (90 ppm hydroquinone) | 25 |
| Cumene hydroperoxide | 1.25 |
| Butyl benzyl phthalate plasticizer | 15 |
| 2,4,4-trimethyl pentyl-3,5-diisobutyrate | 5 |
| Alkyl benzyl phthalate low b.p. plasticizer | 6 |
| Ba—Zn phosphite heat stabilizer | 3 |
| Epoxidized tall oil | 4 |
| UV absorber | 0.4 |
| Toner | 0.3 |

Gelling and firming of the applied resinous wear layer is accomplished by heating in an oven atmosphere having an elevated temperature of just under 300° F. for a time of about 2 minutes.

The gelled resinous wear layer is then mechanically embossed with a fine overall pattern of a parchment type paper-like texture in a Watson-Stillman press for about 2 minutes under a pressure of about 140 pounds per square inch gauge and at an elevated temperature created in the resinous wear layer of just over 300° F.

The heated mechanical embossing takes place, along with the polymerization and/or cross-linking of the trimethylol propane trimethacrylate in the resinous wear layer but only in those surface portions thereof lying directly over the cobalt naphthenate promoter, whereas there is substantially no polymerization and/or cross-linking to any significant degree in those other surface portions of the resinous wear layer not lying directly over the cobalt naphthenate promoter.

Additionally, the melt viscosity of the resinous wear layer portions lying directly over the cobalt naphthenate promoter is materially increased, whereas the melt viscosity of the other resinous wear layer portions not lying directly over the cobalt naphthenate promoter is substantially unchanged.

The mechanically over-all embossed material is then heated in a fusion oven maintained at an elevated temperature of about 430° F. for about 1½ minutes. Fusion of the resinous materials takes place, along with blowing or foaming of the base resinous plastisol in those portions not lying under the trimellitic anhydride inhibitor in the printing ink pattern or design. There is very little blowing or foaming in those portions of the base resinous composition lying directly under the trimellitic anhydride. The chemical embossing effect is excellent.

In addition, the elevated, chemically embossed surface portions or lands of the resinous wear layer, as shown in FIG. 1, develop a sleek, glossy or shiny surface finish, with high brilliance and sheen, due to the softening, melting and flowing of the resinous wear layer thereat, whereas the normal height or chemically unembossed surface portions or mortars retain their flat, dead or dull mat finish or texture created by the mechanical embossing in the Watson-Stillman Press, due to the resistance to heat of such polymerized and/or cross-linked thermoset surface portions having a higher melt viscosity.

The appearance of the resinous material, after the blowing or foaming cycle is very much like that of a glossy, glazed ceramic tile of high sheen, surrounded by a flat, dead or dull mat finish giving the appearance of grout or other cementitious material between the shiny, glossy ceramic tiles.

Also, during the more highly elevated temperatures of the blowing or foaming and fusion procedures, those surface portions of the resinous wear layer which are not polymerized and/or cross-linked now become polymerized and/or cross-linked, even though they do not lie directly over the cobalt naphthenate promoter, inasmuch as at such more elevated temperatures the assistance of the promoter is not required for the activation or the decomposition of the free radical polymerization initiator or catalyst to bring about such desired reaction.

All portions of the resinous wear layer thus contain polymerized and/or cross-linked reactive polymerizable monomeric materials and have relatively higher melt viscosities. At the conclusion of the blowing or foaming operation, there is substantially no unreacted polymerizable monomeric materials in the resinous wear layer which is substantially monomer free.

Testing by means of solubility in tetrahydrofuran establishes that the trimethylol propane trimethacrylate is not polymerized or cross-linked prior to the mechanical embossing procedure; that it is polymerized and/or cross-linked during the mechanical embossing procedure but only in those surface portions of the resinous wear layer lying directly over the cobalt naphthenate promoter; and that it is substantially completely polymerized and/or cross-linked and thermoset in all surface portions after the blowing or foaming and fusion cycle is completed.

The different colors of the printed pattern or design of the printing ink compositions are in complete and perfect registry with (1) the above-described mechanical embossing effects of the contrasting sleek, glossy and shiny surface portions and the flat, dead or dull surface portions, as well as with (2) the above-described chemical embossing effects of the relatively higher and lower surface portions on the surface of the resinous wear layer. The principles of the present invention find excellent application in the production of resilient floor coverings.

EXAMPLE II

The procedures described in Example I are followed substantially as set forth therein with the exception that the promoter in the printing ink composition comprises 1.2 grams of N,N-dimethyl-p-toluidine and 1 gram of cobalt naphthenate. The results of this Example are generally comparable to the results obtained in Example I. Similar results are obtained with a combination of 1 part of vanadium naphthenate and 3 parts of cobalt naphthenate.

EXAMPLE III

The procedures described in Example II are followed substantially as set forth therein, with the exception that the N,N-dimethyl-p-toluidine promoter in the printing ink composition is replaced by N,N-diethyl-p-toluidine. The results of this Example are generally comparable to the results obtained in Example II.

EXAMPLE IV

The procedures described in Example II are followed substantially as set forth therein, with the exception that the N,N-dimethyl-p-toluidine promoter in the printing ink composition is replaced by N,N-dimethyl aniline. The results of this Example are generally comparable to the results of Example II.

EXAMPLE V

The procedures described in Example II are followed substantially as set forth therein with the exception that the N,N-dimethyl-p-toluidine promoter in the printing ink composition is replaced by N,N-diethyl aniline. The results of this Example are generally comparable to the results of Example II.

EXAMPLES VI-VIII

The procedures described in Example I are followed substantially as set forth therein with the exception that the trimethylol propane trimethacrylate (the reactive polymerizable monomeric material in the resinous wear layer) is replaced by (Example VI) pentaerythritol tetramethacrylate, (Example VII) pentaerythritol triacrylate, and (Example VIII) neopentyl glycol diacrylate. The results of these Examples are generally comparable to the results of Example I.

EXAMPLE IX

The procedures described in Example I are followed substantially as set forth therein with the exception that the mechanical embossing is accomplished by applying to the surface of the resinous wear layer a paper having a dead or dull mat surface, followed by pressing and heat. The top platen temperature is 340° F. to 360° F. and the total pressure is 15,000 pounds. The contact time is 20 seconds. The paper possesses a release surface and is easily removed from the top surface of the resinous wear layer, prior to the blowing or foaming and fusion procedure. The results of this Example are generally comparable to the results of Example I.

EXAMPLE X-XI

The procedures described in Example IX are followed substantially as set forth therein with the exception that the contact time is changed to 30 seconds (Example X) and 10 seconds (Example XI). The temperature is about 340° F. and the applied total pressure again is 15,000 pounds gauge. The results of this Example are generally comparable to the results obtained in Example IX.

EXAMPLE XII

The procedures described in Example I are followed substantially as set forth therein, with the exception that the product shown in FIG. II is obtained. This is done by including the trimellitic anhydride blowing or foaming inhibitor in certain printed portions of the pattern or design of the printing ink composition and then including the cobalt naphthenate polymerization temperature-lowering promoter in other printed portions of the pattern or design of the printing ink composition.

The surface areas of the resinous wear layer over the inhibitor-containing portions of the printing ink composition are not elevated or raised and are smooth, shiny and glossy. The portions of the base resinous composition below the inhibitor-containing portions of the printing ink composition are not blown or foamed and are non-cellular.

The surface areas of the resinous wear layer not over the inhibitor-containing portions of the printing ink composition are elevated or raised and are dead or dull mat finished. The portions of the base resinous composition not below the inhibitor-containing portions of the printing ink composition are blown or foamed and are cellular.

The entire resinous wear layer is substantially monomer-free and substantially all portions thereof contain substantially completely polymerized and/or cross-linked and thermoset polymeric materials derived from the polymerization and/or cross-linking and thermosetting of the trimethylol propane trimethacrylate reactive polymerizable monomeric materials. All portions of the resinous wear layer have increased melt viscosities.

Thus, the results of this Example are basically similar to the results of Example I, although in a reverse fashion but following the same basic principles.

Although several specific working Examples of the inventive concept have been described, the invention in its broader aspects is not to be construed as limited thereto but to include various other equivalent features as set forth in the claims appended hereto. It is to be understood that any suitable changes, modifications or variations may be made without departing from the spirit and the scope of the appended claims.

What is claimed is:

1. A differential gloss resinous sheet material comprising:
   a base resinous material, portions of which are blown or foamed and portions of which are unblown or unfoamed;
   a printing ink composition on said base resinous material in the form of a predetermined pattern or design, some printed portions of which contain a blowing or foaming inhibitor and some printed portions of which contain a polymerization promoter, said blowing or foaming inhibitor and said polymerization promoter occupying the same or different portions; and
   a substantially monomer-free resinous wear layer, substantially all surface portions of which contain substantially completely polymerized and/or cross-linked and thermoset polymeric materials derived from the polymerization and/or cross-linking and thermosetting of reactive polymerizable monomeric materials brought about by the activation or decomposition of free radical polymerization initiators or catalysts, some surface portions of said substantially monomer-free resinous wear layer being elevated or chemically embossed and other surface portions being of normal height or chemically unembossed and some surface portions of said substantially monomer-free resinous wear layer having a shiny or lustrous, smooth, high gloss surface and other surface portions having a dead or dull, mechanically embossed, low gloss surface,
   combinations of (1) said blown or foamed and unblown or unfoamed portions, and (2) said printed portions containing said blowing or foaming inhibitors and said polymerization promoters, and (3) said high gloss and said low gloss surface portions being in substantially perfect registry.

2. A differential gloss resinous sheet material as defined in claim 1, wherein said polymerization promoter comprises cobalt naphthenate.

3. A differential gloss resinous sheet material as defined in claim 1, wherein said polymerization promoter comprises an N,N-dialkyl toluidine.

4. A differential gloss resinous sheet material as defined in claim 1, wherein said polymerization promoter comprises an N,N-dimethyl-p-toluidine.

5. A differential gloss resinous sheet material as defined in claim 1, wherein said polymerization promoter comprises an N,N-dialkyl aniline.

6. A differential gloss resinous sheet material as defined in claim 1, wherein said polymerization promoter comprises an N,N-dimethyl aniline.

7. A differential gloss resinous sheet material as defined in claim 1, wherein said polymerization promoter comprises an N,N-diethyl-p-toluidine.

8. A differential gloss resinous sheet material as defined in claim 1, wherein said polymerization promoter comprises an N,N-diethyl aniline.

9. A method of making a differential gloss resinous sheet material which comprises:

forming a gelled, base resinous material containing a blowing or foaming agent;

applying to said gelled, base resinous material a printing ink composition in a predetermined pattern or design, some portions of which contain a blowing or foaming inhibitor and some portions of which contain a polymerization promoter, said blowing or foaming inhibitor and said polymerization promoter occupying the same or different portions;

applying to said printed, gelled base resinous material a resinous wear layer containing substantially uniformly therein reactive polymerizable monomeric materials and free radical polymerization initiators or catalysts;

mechanically dead or dull mat embossing the entire surface of said resinous wear layer at an elevated temperature below the normal activation or decomposition temperature of said free radical polymerization initiator or catalyst but which is sufficient to activate or decompose said free radical polymerization initiator or catalyst in those portions of said resinous wear layer lying directly over the portions containing said polymerization promoter in said printed pattern or design, whereby the reactive polymerizable monomeric materials in said resinous wear layer polymerize to become cross-linked and thermoset only in those portions lying directly over said polymerization promoter and to permanently set said dead or dull mat embossing therein; and heating to a temperature sufficient to blow or foam said base resinous material and to cause said dead or dull embossing in the unpolymerized surface portions of said resinous wear layer to soften, melt and flow into a smooth glossy surface and to be polymerizaed therein to become cross-linked and thermoset to permanently set said smooth glossy surface thereon, said resinous wear layer being substantially monomer-free and in which substantially all surface portions contain substantially completely polymerized and/or cross-linked and thermoset polymeric materials derived from said reactive polymerizable monomeric materials.

10. A method of making a differential gloss resinous sheet material as defined in claim 9, wherein said blowing or foaming inhibitor and said polymerization promoter occupy the same printed portions of the printing ink composition.

11. A method of making a differential gloss resinous sheet material as defined in claim 9, wherein said blowing or foaming inhibitor and said polymerization promoter occupy different printed portions of the printing ink composition.

12. A method of making a differential gloss resinous sheet material as defined in claim 9, wherein said mechanical dead or dull mat embossing of the surface of said resinous wear layer is accomplished by pressing a fibrous paper or paper product thereagainst under heat and pressure.

13. A method of making a differential gloss resinous sheet material as defined in claim 9, wherein substantially all surface portions of said resinous wear layer possess relatively higher melt viscosities and have increased resistance to heat and other subsequent changes in shape or configuration.

* * * * *